US008346237B2

(12) United States Patent
Labidi et al.

(10) Patent No.: US 8,346,237 B2
(45) Date of Patent: *Jan. 1, 2013

(54) COMMUNICATIONS DEVICE HAVING A COMMUTE TIME FUNCTION AND METHODS OF USE THEREOF

(75) Inventors: Cyril Labidi, San Francisco, CA (US); Michael M. Lee, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/207,311

(22) Filed: Aug. 10, 2011

(65) Prior Publication Data

US 2011/0295498 A1    Dec. 1, 2011

Related U.S. Application Data

(63) Continuation of application No. 12/233,361, filed on Sep. 18, 2008, now Pat. No. 8,000,694.

(51) Int. Cl.
*H04W 4/00* (2009.01)

(52) U.S. Cl. ............... 455/418; 455/414.3; 455/450; 455/567; 701/117; 701/200; 701/202; 701/204

(58) Field of Classification Search .......... 455/418, 455/414.3, 450, 567; 701/117–118, 200, 701/202, 204, 208–209
See application file for complete search history.

(56) References Cited

U.S. PATENT DOCUMENTS

| 6,480,783 | B1 * | 11/2002 | Myr ............................ 701/117 |
| 6,678,215 | B1 | 1/2004 | Treyz |
| 7,139,722 | B2 | 11/2006 | Perrella et al. |
| 7,941,753 | B2 * | 5/2011 | Meisels et al. ............. 715/751 |
| 2001/0056443 | A1 | 12/2001 | Takayama et al. |
| 2004/0267887 | A1 | 12/2004 | Berger et al. |
| 2005/0027437 | A1 | 2/2005 | Takenaga et al. |
| 2005/0091096 | A1 | 4/2005 | Coates et al. |
| 2005/0132305 | A1 | 6/2005 | Guichard et al. |

(Continued)

FOREIGN PATENT DOCUMENTS

DE    19818348 A1    10/1999

(Continued)

OTHER PUBLICATIONS

PCT International Search Report and Written Opinion for PCT International Application No. PCT/US08/08004 mailed Jan. 8, 2009 (11 pages).
PCT International Preliminary Report on Patentability for PCT International Application No. PCT/US2008/008004 dated Jan. 5, 2010 (9 pages).

(Continued)

*Primary Examiner* — Kiet Doan
*Assistant Examiner* — Michael T Vu
(74) *Attorney, Agent, or Firm* — Kilpatrick Townsend & Stockton

(57) ABSTRACT

Apparatuses and methods to operate a commute time function of a communications device are described herein. In one embodiment, the commute time function is automatically activated based on an event and is then performed by (i) determining an up-to-date commute time based on commute information and (ii) displaying or speaking the up-to-date commute time on the device. In one embodiment, triggered by and before the occurrence of a calendar event, a device obtains a current commute time (based on the commute information and based on current traffic conditions1). In this embodiment, the device reschedules the calendar event based on the current commute time, by sending an update to the contacts with whom the user is to meet that indicates a change to the calendar event. Other embodiments are also described.

22 Claims, 4 Drawing Sheets

U.S. PATENT DOCUMENTS

| | | | |
|---|---|---|---|
| 2006/0166656 | A1 | 7/2006 | Klicpera et al. |
| 2006/0218029 | A1 | 9/2006 | Chin |
| 2006/0240877 | A1 | 10/2006 | Filiba et al. |
| 2007/0060108 | A1 | 3/2007 | East et al. |
| 2007/0118415 | A1 | 5/2007 | Chen et al. |
| 2007/0271031 | A1* | 11/2007 | Jung et al. ............. 701/204 |
| 2008/0167937 | A1 | 7/2008 | Coughlin |
| 2009/0006994 | A1 | 1/2009 | Forstall et al. |
| 2009/0152349 | A1 | 6/2009 | Bonev et al. |
| 2009/0265091 | A1* | 10/2009 | Machii et al. ............. 701/200 |

FOREIGN PATENT DOCUMENTS

| | | | |
|---|---|---|---|
| EP | 1146739 | A2 | 10/2001 |
| EP | 1562321 | A2 | 8/2005 |

OTHER PUBLICATIONS

PCT International Search Report and Written Opinion (dated Mar. 1, 2010), International Application No. PCT/US2009/057210, International Filing Date Sep. 16, 2009, (18 pages).

PCT Invitation to Pay Additional Fees/Partial International Search (dated Sep. 12, 2009), International Application No. PCT/US2009/057210, International Filing Date Sep. 16, 2009, (5 pages).

PCT International Preliminary Report on Patentability (mailed Mar. 31, 2011), International Application No. PCT/US2009/057210, International Filing Date Sep. 16, 2009, (10 pages).

Office Action dated Jun. 6, 2012 issued by the Chinese Patent Office for Chinese Application for Invention No. 200980141509.5.

* cited by examiner

COMMUNICATIONS DEVICE HAVING A COMMUTE TIME FUNCTION AND METHODS OF USE THEREOF

This application is a continuation of U.S. patent application Ser. No. 12/233,361, filed on Sep. 18, 2008 now U.S. Pat. No. 8,000,694.

FIELD

Embodiments of the invention relate to the operation of a commute time function in a portable voice communications device. Other embodiments are also described.

BACKGROUND

In metropolitan areas, traffic congestion remains a major problem. The Texas Transportation Institute reports that, in 2005, the annual delay experienced by a traveler during peak times in the Los Angeles area is 72 hours and 46% of the delay is caused by incidents including car accidents and construction. As a result, the increased fuel consumption due to travel in congested conditions rather than in free-flow conditions is 57 gallons per peak traveler in 2005.

A main contributing factor of traffic congestion is that the traveler is not properly informed of the traffic conditions prior to embarking on his daily commute. Drivers primarily rely on radio and television reports for information on traffic conditions. The main shortcomings of these traditional sources of information include (i) the delayed reporting of traffic congestion due to accidents and disabled vehicles and (ii) the reporting of traffic conditions on routes which are irrelevant to the driver.

Today, commuters may also turn to the Internet to obtain up-to-date traffic information and estimated commute time. Numerous websites on the Internet (e.g., www.SigAlert.com) allow the user to view the current traffic conditions on the freeways including the speed of travel and the location and time of accidents. Other websites (e.g., Google Maps) provide the user with an estimated commute time for a selected route.

SUMMARY

Methods and apparatuses to operate a commute time function of a portable voice communications device (or "mobile device") are described.

In one embodiment, the commute time function of the mobile device is automatically activated and then performed in order to indicate the up-to-date commute time. In this embodiment, a method to operate a commute time function of the mobile device starts by receiving and storing commute information including the start address and the destination address which is provided by a user. The user is then prompted for an event including a time entry and a day entry which is associated with the stored commute information. The commute time function is automatically activated based on the event, at or before occurrence of the event, and the commute time function is then performed by a) determining an up-to-date commute time based on the commute information, and, optionally, b) displaying or speaking, before occurrence of the event, the up-to-date commute time together with the commute information, on the device.

The point in time at which the commute time function is automatically activated may be set manually, by the user. For example, where the event is a wake-from-sleep alarm associated with a commute to the office, and the commute to the office has been in the range of one hour+/– fifteen minutes, the user may wish to set activation time of the commute time function to be fifteen minutes before such an event. If the variation in commute time is longer, then the commute time function activation time may be set to be proportionally earlier. In one embodiment, the determination of the commute time may involve sending the commute information to a website or an internet accessible service that computes the up-to-date commute time based on current or up-to-date traffic conditions for the commute information. The up-to-date commute time may then be received from the website or interne accessible service.

In some embodiments, other applications on the mobile device may be affected by the up-to-date commute time. For instance, if the commute time is longer than an expected time, which may be manually set by the user or automatically computed based on a history of stored instances of the commute time, adjustments may be made to the applications to reflect that the user has a shorter amount of time to prepare for departure on her commute or that her commute is longer. For example, a previously set alarm wake-up time may be adjusted to an earlier time, a louder music selection may be played at the alarm wake-up time, or a greater number of newsfeeds may be downloaded to the mobile device (to be experienced by the user during her longer commute). In one embodiment, the selected music playlist or the number of downloaded newsfeeds may be timed to correspond to the commute time, e.g. the total length (in terms of time) of the playlist or the downloaded newsfeeds may be proportional to the commute time.

In one embodiment, based on the commute time, the activation time of a third-party device such as a coffee machine, an alarm, and electronic calendar may be adjusted. For example, if a longer commute time is reported such that the user needs to wake up at an earlier time to compensate for the increase in travel time, the coffee machine may be activated to start brewing at an earlier time as well.

In one embodiment, a user interface of the device may present, via visual and/or spoken output, the current commute time prior to a calendar event associated with the commute, in order to ensure that the user is not late to the location of the event. In another embodiment, a calendar event previously set by the user and identifying contacts with whom the user is to meet may be rescheduled based on the commute time by sending an update to the contacts to indicate or request a change to the calendar event. The calendar event may include a time, date, and location of a meeting. In one embodiment, a "one-click" icon which allows the user to obtain a current commute time may also be displayed on the user interface.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

The following description is the divided into three parts. Part I gives a brief overview of a mobile communications device in which an embodiment of the invention may be implemented. Part II describes methods to operate a commute time function of the mobile device. Part III describes a further apparatus in which the commute time function may be implemented.

I. Overview of a Mobile Communications Device

Figure 1:
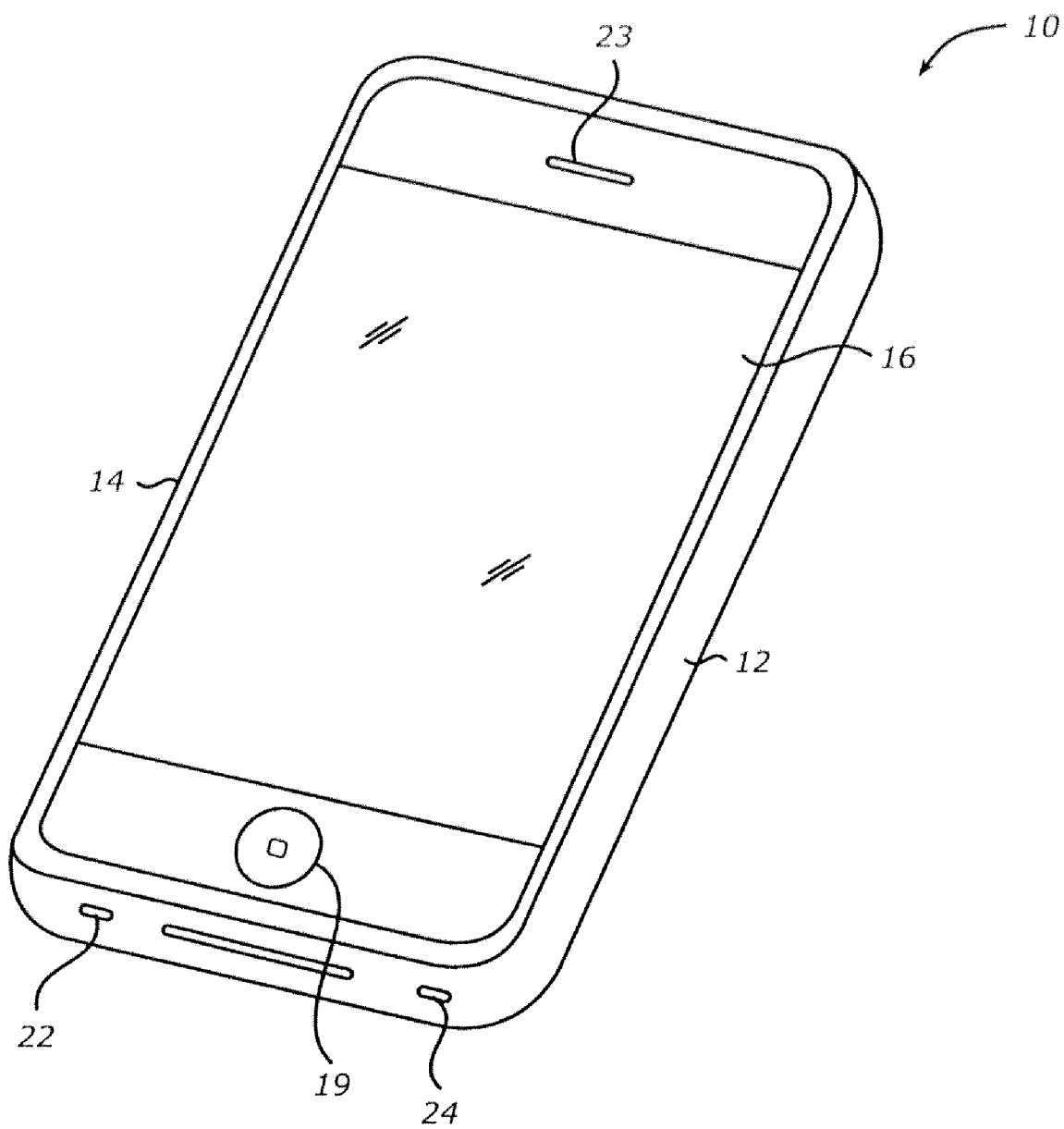
FIG. 1 shows a perspective view of an illustrative mobile device in which an embodiment of the invention may be implemented.

FIG. 1 shows an illustrative mobile communications device 10 in which an embodiment of the invention may be implemented. Device 10 may include a housing 12 having a bezel 14. The bezel 14 may be used to hold a display screen 16 on the front face of the device 10. The display screen 16 may also include a touch screen. Device 10 may also include one or more physical buttons and/or virtual buttons (on the touch screen). The display screen 16 may be used to display the commute time as a visual output. In one embodiment, button 19 is a physical button that when actuated by the user brings a graphical user interface of the device to its home or main menu, as performed by an iPhone® device for example. The home menu may include a launch icon for the commute time function.

Device 10 may also include input-output components such as ports and jacks. For example, opening 22 may form the microphone port and opening 24 may form a speaker port. The sound during a telephone call is emitted through opening 23 which may form a speaker port for a telephone receiver that is placed adjacent to the user's ear during a call. For example, when the commute time is presented via spoken output, the openings 23 and 24 may be used as speaker ports.

Figure 2:
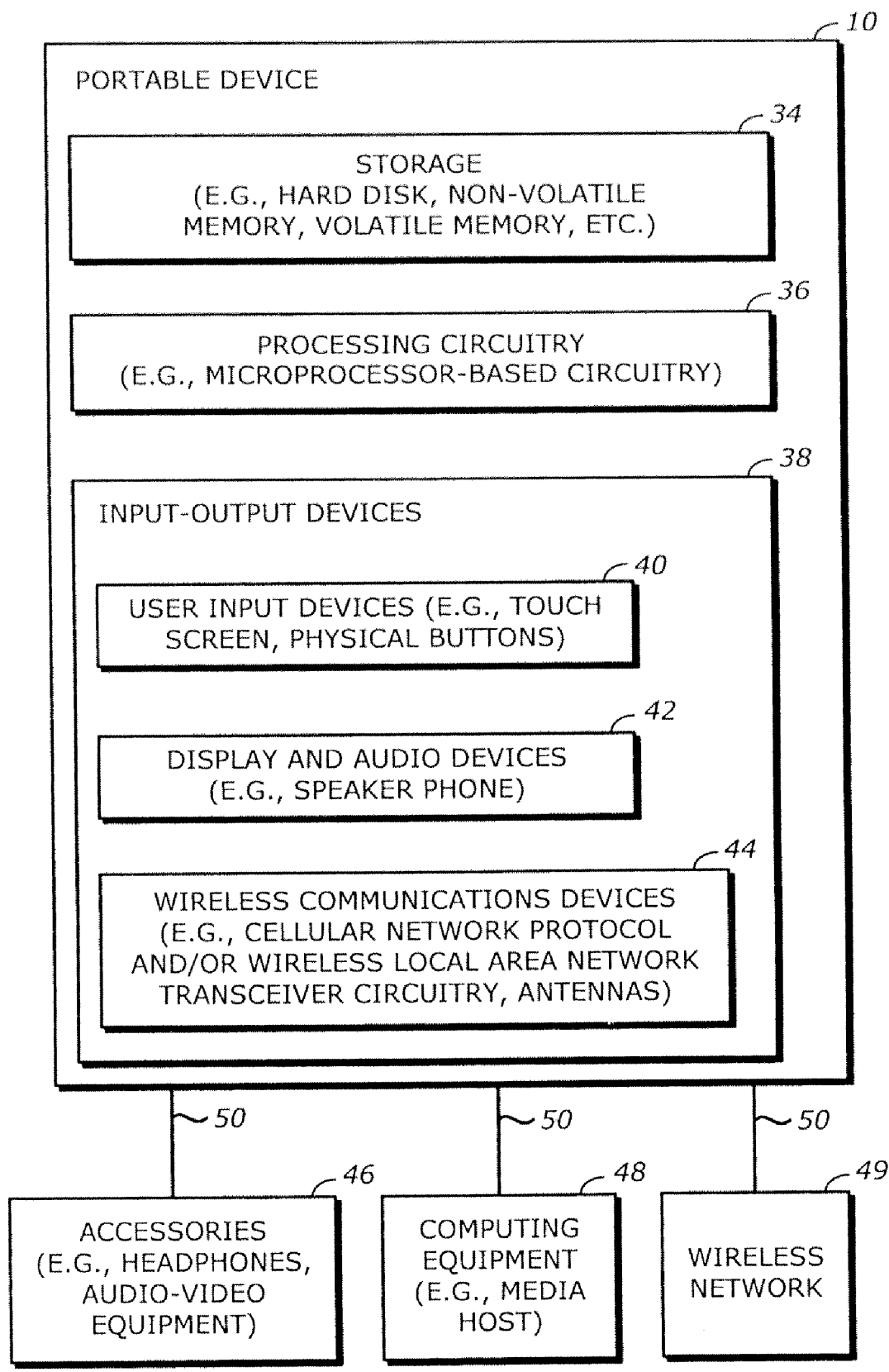
FIG. 2 shows a block diagram of the example mobile device.

Referring to FIG. 2, a block diagram of the example mobile device in which an embodiment of the invention may be implemented is depicted. However, it is noted that not every embodiment of the invention requires the entire architecture as illustrated in FIG. 2. As shown in FIG. 2, device 10 may include input-output devices 38, processing circuitry 36, and storage 34.

Input-output devices 38 allow the device 10 to receive data as well as provide data. In one embodiment, input-output devices 38 may include user input-output devices 40, display and audio devices 42, and wireless communications devices 44.

Using the user input-output devices 40, the user may supply commands to control the operations of the device 10. In one embodiment, the user input-output devices 40 include a display screen 16, a button 19, a microphone port 22, a speakerphone or loudspeaker port 24, and an earpiece speaker port 23 (used as a close to the ear receiver port).

Input-output devices 38 may include display and audio devices 42. Display and audio devices 42 may contain audio-video interface equipment such as jacks and other connectors for external devices.

Input-output devices 38 may also include wireless communications devices 44 having communications circuitry such as radio frequency (RF) transceiver circuitry, antennas, etc. In one embodiment, the microphone port 22, the speaker ports 23 and 24 may be coupled to the communications circuitry to enable the user to participate in wireless telephone or video calls. A variety of different wireless communications networks and protocols may be supported in the wireless communications devices 44. These include: a cellular mobile phone network (e.g., a Global System for Mobile communications, GSM, network), including current 2G, 3G and 4G networks and their associated call and data protocols; and an IEEE 802.11 data network (WiFi or Wireless Local Area Network, WLAN) which may also support wireless voice over internet protocol (VOIP) calling.

The processing circuitry 36 included in device 10 may include a processor, such as a microprocessor, a microcontroller, a digital signal processor, or a central processing unit, and other needed integrated circuits such as glue logic. The term "processor" may refer to a device having two or more processing units or elements, e.g. a CPU with multiple processing cores. The processing circuitry 36 may be used to control the operations of device 10 by executing software instructions or code stored in the storage 34. The storage 34 may include one or more different types of storage such as hard disk drive storage, nonvolatile memory, and volatile memory such as dynamic random access memory. In some cases, a particular function as described below may be implemented as two or more pieces of software in the storage 34 that are being executed by different hardware units of a processor.

The processing circuitry 36 (or simply processor) may be programmed by a commute time module (in the storage 34) to perform a commute time function as described below. It may also act as a commute time activator and/or a calendar-event rescheduler (again, as programmed in accordance with software in the storage 34). This is in addition to it executing software that uses the wireless communications functionality of the device 10 to initiate an outgoing call and/or send a Short Message Services, SMS, text message, and to establish a TCP/IP connection (over a wireless link) with a remote server over the Internet. Such wireless communications will be used for, e.g. alerting contacts of the user of the device about rescheduling a calendar event and acquiring the latest or up-to-date commute time).

In one embodiment, the processing circuitry 36 may receive in data including commute information and an event associated with the commute information and perform an analysis of that data, as described below. For example, the data may be analyzed through an artificial intelligence process or in the other ways described herein. As a result of that analysis, the processing circuitry 36 may then cause the commute time function to be automatically activated. The term "automatically" may describe a cause and effect relationship, such as where something is altered, changed, or set without receiving a user input or action directed at the altered or changed result. In some cases, the term "automatically" may describe a result that is a secondary result or in addition to a primary result according to a received user setting or selection.

Device 10 can communicate with external devices such as accessories 46, computing equipment 48, and wireless network 49, as shown by paths 50 and 51. Paths 50 include wired and wireless paths while path 51 may be a wireless path. Accessories 46 may include headphones (e.g., a wireless cellular headset or audio headphones). Wireless network 49 may include any suitable network equipment such as cellular telephone base stations, cellular towers, wireless data networks, computers associated with wireless networks, etc.

Part II: Methods to Operate the Commute Time Function

The following embodiments of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

Figure 3:
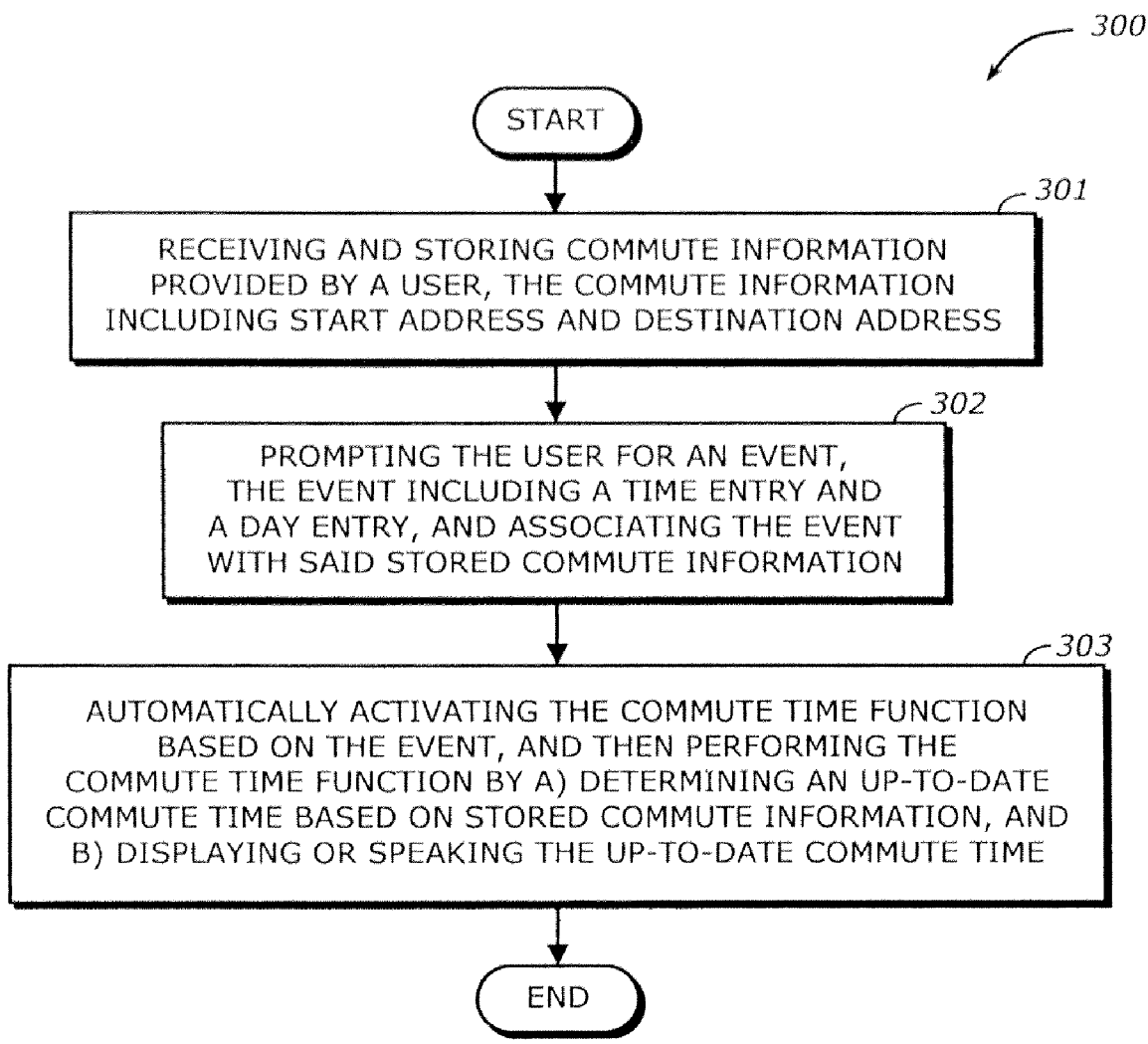
FIG. 3 shows a flow diagram of one embodiment of a method to operate a commute time function of the mobile device.

A flow diagram of one embodiment of method 300 for operating the commute time function of a mobile device is shown in FIG. 3.

Method 300 begins by receiving and storing commute information provided by the user (Block 301). The commute time information may include a starting street address and a destination street address. For example, the user may input his home address as the start address and his work address as the destination address.

At Block 302, the user is prompted for an event which is associated with the stored commute information. For example, the event may be inputted as 7:00 a.m. on Monday. The event may include a time entry and a day entry, and optionally a descriptive entry (Block 302). In one embodiment, the event may be a routine event that is set by the user to repeat according to a schedule. For example, the user may set the event as "main office, weekdays at 7:00 a.m." such that the event is repeated on Monday through Friday at 7:00 a.m.

At Block 303, the commute time function is automatically activated based on the event and then the commute time function is performed (Block 303). The automatic activation may be set as follows. Consider as an example the event of "main office, weekdays at 7 a.m.". The associated commute for this event may be a trip from the user's home to the main office. Assume this commute has been in the range of about one hour on average. If it takes the user about forty-five minutes to get ready before departure to the office, the user may wish to set the automation time for the commute time function to be 5:00 a.m. on weekdays.

Performing the commute time function, at Block 303, includes determining an up-to-date commute time based on the stored commute information (Block 303a). In one embodiment, the commute time may be determined by sending the previously stored commute information to a transportation information service provider over the Internet. For example, the commute information may be sent to a website or an internet accessible service that computes the up-to-date or current commute time based on current or up-to-date traffic conditions, for the given commute information. The up-to-date commute time may then be received by the device 10 from the website or Internet accessible service. In this embodiment, performing the commute time function also includes displaying or speaking the up-to-date commute time, on the device (Block 303b). Thus, using the above example, beginning at 5:00 a.m., the mobile device may display on the display screen 16 and/or speak via the loudspeaker port 24, the user's home address and work address, or other identification of the commute, as well as the up-to-date commute time for this commute. Block 303b may be repeated for example every five minutes or other suitable interval, to keep the user updated about his upcoming commute.

In some embodiments, based on the up-to-date commute time obtained, the functionalities of other applications on the mobile device may be altered. For instance, if the commute time is longer than an expected time, which may be manually set by the user or automatically computed based on a history of stored instances of the commute time, adjustments may be made to the applications to reflect that the user has a shorter amount of time to prepare for departure on her commute or that her commute is longer. In the above example, if the current commute time checked at 5:00 a.m. is 15 minutes longer than usual, an alarm wake-up time that was previously set at 5:15 a.m. may be adjusted to an earlier time of 5:05 a.m. in order to provide the user with additional time so as to reach the office by the target time of 7:00 a.m.

In one embodiment, the music to be played at a time previously set by the user may be selected based on whether the commute time is longer or shorter than a specified time. The type of music or the song to be played may reflect the urgency at which the user needs to wake-up to get ready for work. For example, a classical symphony may be played at the previously set alarm wake-up time to indicate that the commute time is shorter than the specified time, whereas a song by a punk band may be played to indicate a longer commute time lies ahead.

In one embodiment, the number of newsfeeds downloaded to the mobile device may also be adjusted based on the reported commute time. In this embodiment, the device may download a number of newsfeeds to the mobile device which correspond to the commute time. For example, if the commute time is determined to require an additional fifteen minutes, the device may download one or more additional newsfeeds, to be experienced by the user during her longer commute.

In one embodiment, a collection of one or more songs ("playlist") selected to be played and/or the number of downloaded newsfeeds may be timed to correspond to the commute time. The total length, in terms of time, of the playlist or the downloaded newsfeeds may be proportional to the commute time. For example, the duration of the playlist or the downloaded newsfeeds may be about equal to or longer than the commute time. If the duration is about equal to the commute time, the last song in the playlist or the last newsfeed to be played may end when the user arrives at the destination address.

In some embodiments, the activation time of a third-party device may be adjusted based on the commute time. For example, the third-party device may be an alarm clock having a previously set activation time of 7:30 a.m. As discussed above, if the commute time is checked at 7:00 a.m. and determined to be fifteen minutes longer, then the wake-up time of the alarm clock may be adjusted to be fifteen minutes earlier, in order to provide the user with extra time to commute to his destination. Similarly, the third-party device may be a coffee machine whose start brewing time may be automatically signaled by the device 10 to be adjusted to be fifteen minutes earlier, so the coffee will be ready at an earlier time.

In one embodiment, the third-party device may be an electronic calendar. Adjusting the activation time of an electronic calendar may include rescheduling a scheduled meeting stored in the electronic calendar based on the current commute time and alerting the people included in the scheduled meeting of the rescheduling.

Part III: Generalized Apparatus to Operate the Commute Time Function

Figure 4:
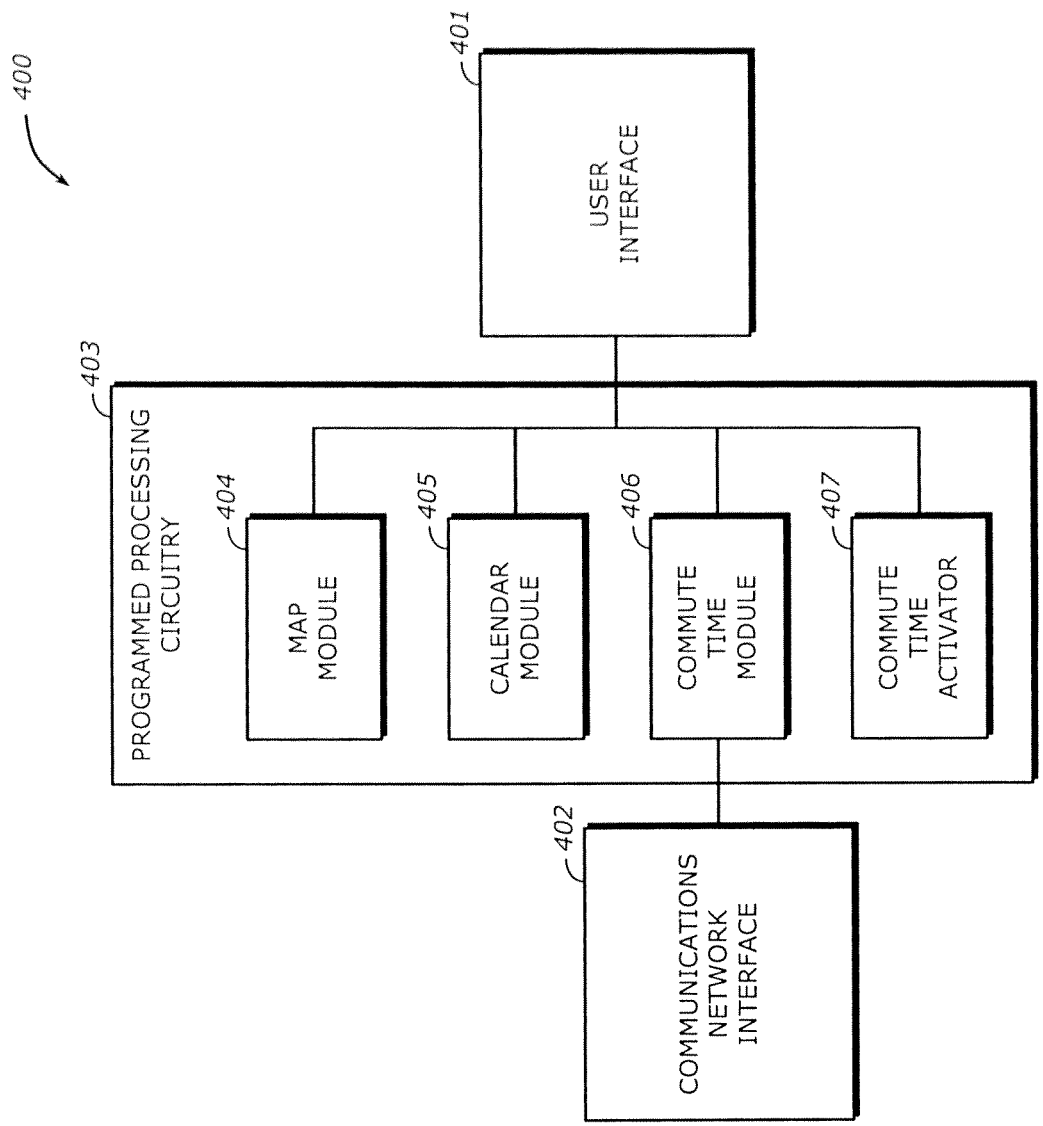
FIG. 4 shows a block diagram of one embodiment of an electronic apparatus supporting the commute time function.

FIG. 4 is a block diagram of one embodiment of a generalized electronic apparatus in which the commute time function may be implemented. The apparatus 400 includes a user interface 401, a communications network interface 402, and programmed processing circuitry 403. The apparatus 400 need not be a handheld mobile device but instead may be for example, a desktop or laptop personal computer.

The user interface 401 may include a display (e.g., including a touch sensitive screen), a speaker, a microphone, user input devices such as a keyboard and mouse (tactile input devices), and their associated interface circuitry and software. The communications network interface 402 may include a local area network interface controller or adapter or a cellular network baseband processor, and their associated interface circuitry and software (e.g., a TCP/IP software stack). For example, the user interface 401 may include the display screen 16 with a built-in touch sensitive screen and associated gesture detection software. The programmed processing circuitry 403 is used to control operations of apparatus 400. The programmed processing circuitry 403 may include a processor that is executing software in storage within the apparatus, including for example a map module 404, a calendar module 405, a commute time module 406, and a commute time activator 407.

Through the user interface 401, the map module 404 (when executed) may acquire commute information from the user and may display the commute information back to the user for example in the form of a street map showing starting and ending addresses. The map module 404 may acquire the commute information via tactile and/or spoken input from a user of the apparatus 400. Similarly, the calendar module 405, which manages the user's electronic calendar, may acquire a calendar event associated with the commute information. In one embodiment, the user may input the commute information and the calendar event by using display screen 16 which may also include a touch sensitive screen. In one embodiment, the user may speak the commute information and the calendar event into the microphone port 22 on the device 10 (see FIG. 2).

In some embodiments, the commute information may include a start address and a destination address and the calendar event may include a time entry and an entry that specifies a day of the week. In other embodiments, the calendar event may include a time, date, and location of a meeting. For example, the user may input as a calendar event: 9:00 a.m. meeting Aug. 28, 2008 at Apple Inc., Infinite Loop 1, Cupertino, Calif. In another embodiment, the start address may be automatically inputted as the apparatus's current location and the destination address is automatically inputted as the location of the calendar event. Apparatus 400 may include a GPS system, which can be used to determine its current location.

The commute time module 406 obtains the current commute time based on the commute information, and based on current traffic conditions obtained through the communications network interface 402. For example, in one embodiment, the commute time may be obtained from a transportation information service provider such as a website or an internet accessible service that computes the commute time based on the current traffic conditions and the commute information provided. In this embodiment, the commute time module 406 may send the commute information to a transportation information service provider over the Internet. The commute time module 406 may then receive the current commute time from the service provider.

Once the commute time module 406 obtains the current commute time, it signals to the user interface 401 to present, via visual and/or spoken output, the current commute time. For example, the user interface 401 may provide a visual output by displaying the current commute time on the display screen 16 and optionally simultaneously with identifying the commute (e.g., by displaying the starting and ending addresses). The user interface 401 may also generate a spoken output by speaking the current commute time using the loudspeaker port 24, for example, or the receiver or earpiece port 23.

In one embodiment, the user interface 401 may display a "one-click" icon, which allows the user to manually activate the commute time module 406 on command, to then display the current commute time. The icon may be associated with a virtual button on a touch screen.

The commute time activator 407 may activate the commute time module 406 based on but before occurrence of the calendar event. For example, if the user inputted 8:00 a.m. on Monday as the calendar event to be associated with a given commute, and the expected commute time is about 30 minutes, the commute time activator 407 may be programmed to activate the commute time module 406 at 7:00 a.m. on Monday. In this manner, if the time required to travel from the user's start address to the end address is longer than a specified time, the user may be alerted of this additional travel time so that he can adjust his time of departure accordingly.

In one embodiment, the commute time module 406 may download one or more newsfeeds whose number or total listening time is based on the commute time. As discussed above, the number of the newsfeeds or total listening time may be about equal to or longer than the commute time such that, if a longer commute time is reported, a greater number of newsfeeds may be downloaded to the apparatus 400.

In another embodiment, the calendar event is previously set by the user and identifies a contact with whom the user is to meet. In this embodiment, the programmed processing circuitry 403 may further implement a calendar-event rescheduler to reschedule the calendar event based on the current commute time by causing an update message to be sent to the contact. The update may indicate or request a change to the calendar event and may be sent to the contact via an SMS text message, an email, and/or an outgoing telephony call.

In one embodiment, the programmed processing circuitry 403 implements a digital media player to play sound files that are stored in the apparatus 400. In this embodiment, the commute time module 406 selects a first music selection for playback by the player if the commute time is longer than a specified time, or a second, different music selection if the commute time is shorter than a specified time. For example, the type of music may reflect the urgency at which the user needs to embark on his commute, based on the obtained commute time.

In one embodiment, the programmed processing circuitry 403 implements an alarm clock. In this embodiment, an alarm clock wake-up time, previously set by the user, may be adjusted automatically. The commute time module 406 may automatically change the wake-up time to an earlier time if the commute time is longer than a specified time, thereby giving the user additional time to travel to his destination.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hard-wired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A machine-implemented method for operating a mobile electronic device having a commute time function, the method comprising:
    receiving and storing commute information associated with a user on the mobile electronic device, the commute information including a start address and a destination address;
    in response to an event having a time entry and a day entry received on the mobile electronic device from the user, associating the event with the stored commute information; and
    automatically activating the commute time function on the mobile electronic device based on the event, including
        determining an up-to-date commute time based on the stored commute information, including
            sending the stored commute information to a remote facility that computes the up-to-date commute time based on up-to-date traffic conditions and the stored commute information, and
            receiving the up-to-date commute time from the remote facility, and
        presenting the up-to-date commute time.

2. The method of claim 1, further comprising automatically adjusting an alarm time to an earlier time in response to the up-to-date commute time being longer than a specified time, the alarm time being previously set by the user.

3. The method of claim 2, wherein the specified time is automatically computed based on a history of stored instances of the up-to-date commute time.

4. The method of claim 1, further comprising:
    automatically selecting a first media in response to the up-to-date commute time being longer than a specified time; and
    automatically selecting a second media in response to the up-to-date commute time being shorter than a specified time, wherein the first and second media are capable of being played via a media player.

5. The method of claim 1, further comprising adjusting an activation time of a third party device based on the up-to-date commute time, the third party device being one of a coffee machine, an alarm clock, and an electronic calendar.

6. The method of claim 5, wherein adjusting the activation time of the electronic calendar comprises:
    rescheduling a scheduled meeting stored in the electronic calendar, the scheduled meeting to include a selected person; and
    alerting the selected person regarding the rescheduling.

7. The method of claim 1, further comprising the mobile electronic device automatically downloading a plurality of news feeds and/or a plurality of songs, a duration of the plurality of news feeds and/or the plurality of songs being about equal to or longer than the up-to-date commute time.

8. A non-transitory machine-readable storage medium having instructions stored therein, which when executed by a machine, cause the machine to perform a method for operating a mobile electronic device having a commute time function, the method comprising:
    receiving and storing commute information associated with a user on the mobile electronic device, the commute information including a start address and a destination address;
    in response to an event having a time entry and a day entry received on the mobile electronic device from the user, associating the event with the stored commute information; and
    automatically activating the commute time function on the mobile electronic device based on the event, including
        determining an up-to-date commute time based on the stored commute information, including
            sending the stored commute information to a remote facility that computes the up-to-date commute time based on up-to-date traffic conditions and the stored commute information, and
            receiving the up-to-date commute time from the remote facility, and
        presenting the up-to-date commute time.

9. The non-transitory machine-readable storage medium of claim 8, wherein the method further comprises automatically adjusting an alarm time to an earlier time in response to the up-to-date commute time being longer than a specified time, the alarm time being previously set by the user.

10. The non-transitory machine-readable storage medium of claim 9, wherein the specified time is automatically computed based on a history of stored instances of the up-to-date commute time.

11. The non-transitory machine-readable storage medium of claim 8, wherein the method further comprises: automatically selecting a first media in response to the up-to-date commute time being longer than a specified time; and automatically selecting a second media in response to the up-to-date commute time being shorter than a specified time, wherein the first and second are capable of being played via a media player.

12. The non-transitory machine-readable storage medium of claim 8, wherein the method further comprises adjusting an activation time of a third party device based on the up-to-date commute time, the third party device being one of a coffee machine, an alarm clock, and an electronic calendar.

13. The non-transitory machine-readable storage medium of claim 12, wherein adjusting the activation time of the electronic calendar comprises: rescheduling a scheduled meeting stored in the electronic calendar, the scheduled meeting to include a selected person; and alerting the selected person regarding the rescheduling.

14. The non-transitory machine-readable storage medium of claim 8, wherein the method further comprises the mobile electronic device automatically downloading a plurality of news feeds and/or a plurality of songs, a duration of the plurality of news feeds and/or the plurality of songs being about equal to or longer than the up-to-date commute time.

15. A mobile device, comprising:
    a map module to receive and store commute information associated with a user, the commute information including a start address and a destination address;

a calendar module to receive an event having a time entry and a day entry from the user and to associate the event with the stored commute information;

a commute time module to automatically determine an up-to-date commute time based on the stored commute information, including sending the stored commute information to a remote facility that computes the up-to-date commute time based on up-to-date traffic conditions and the stored commute information, and receiving the up-to-date commute time from the remote facility; and a user interface to present the up-to-date commute time.

16. The mobile device of claim 15, wherein the calendar module is configured to automatically adjust an alarm time to an earlier time in response to the up-to-date commute time being longer than a specified time, the alarm time being previously set by the user.

17. The mobile device of claim 16, wherein the specified time is automatically computed based on a history of stored instances of the up-to-date commute time.

18. The mobile device of claim 15, wherein the commute time module is configured to:

automatically select a first media in response to the up-to-date commute time being longer than a specified time; and automatically select a second media in response to the up-to-date commute time being shorter than a specified time, wherein the first and second are capable of being played via a media player.

19. The mobile device of claim 15, wherein the commute time module is further configured to adjust an activation time of a third party device based on the up-to-date commute time, the third party device being one of a coffee machine, an alarm clock, and an electronic calendar.

20. The mobile device of claim 19, wherein adjusting the activation time of the electronic calendar comprises:

rescheduling a scheduled meeting stored in the electronic calendar, the scheduled meeting to include a selected person; and alerting the selected person regarding the rescheduling.

21. The mobile device of claim 15, wherein the commute time module is configured to automatically download a plurality of news feeds and/or a plurality of songs, a duration of the plurality of news feeds and/or the plurality of songs being about equal to or longer than the up-to-date commute time.

22. An apparatus, comprising:

means for receiving and storing commute information associated with a user, the commute information including a start address and a destination address;

in response to an event having a time entry and a day entry received from the user, means for associating the event with the stored commute information; and means for automatically activating a commute time function based on the event, including determining an up-to-date commute time based on the stored commute information, including sending the stored commute information to a remote facility that computes the up-to-date commute time based on up-to-date traffic conditions and the stored commute information, and receiving the up-to-date commute time from the remote facility, and presenting the up-to-date commute time.

* * * * *